March 10, 1959   H. L. HOCKEL ET AL   2,876,948
ROTARY AIR COMPRESSORS
Filed July 2, 1956

United States Patent Office 2,876,948
Patented Mar. 10, 1959

2,876,948
ROTARY AIR COMPRESSORS

Hans Ludwig Hockel, Mannheim-Feudenheim, and Wilhelm Gerberich, Mannheim, Germany, assignors to Knorr-Bremse G. m. b. H., Munich, Germany Application July 2, 1956, Serial No. 595,561

Claims priority, application Germany July 2, 1955

1 Claim. (Cl. 230—210)

The invention relates to rotary air compressors of multi-cell construction having a cylindrical casing. Such air compressors have hitherto been constructed either as water-cooled or surface-cooled compressors. Water cooling pre-supposes the presence of an appropriate source of cooling water, which is generally only available with stationary installations, whilst surface cooling does not allow sufficient heat dissipation for high performance installations.

The object of the invention is to obviate these disadvantages. This problem is solved by using forced air cooling, and the aim of the invention is seen to be primarily an arrangement which adapts the construction of the compressor as necessitated by its method of operation, to the purposes of forced air cooling with a minimum outlay. This is particularly facilitated if the space required about the actual compressor casing for the longitudinal tie-rods used for holding together the bearing plates and casing, is used as the channel along which the cooling air is passed. The cooling air channels are formed, according to the invention, by slots in one bearing plate and axially parallel ribs, by an outer casing, and by outlet apertures therein. The only additional part which is required is an axial fan wheel which is preferably constructed of sheet metal, so that the total outlay is extremely small as compared with the improvement in cooling.

A further object of the invention consists in improving the lateral sealing of rotors of rotary multi-cell compressors. Such seals consist of a sealing ring which is pressed by springs in the axial direction against the side wall of the compressor casing.

The known sealing rings are arranged in annular grooves in the end faces of the rotor and rotate along with the said rotor. Axial sealing is effected by a sealing member which is constructed in the manner of a piston ring and bears against the outer diameter of the annular groove. The pressure application springs are situated in holes in the rotor. These sealing arrangements have the disadvantage that they require two movable sealing means and also cause difficulties during assembly owing to the many small springs.

The invention aims at obviating these disadvantages. This problem is solved according to the invention by using for sealing purposes, a per se known axial seal which is mounted fast in the casing and consists of a sliding contact ring and an elastic ring carrier made of rubber which is resilient in the axial direction, and which at the same time imparts application pressure to the sliding contact ring and effects a seal in the radial direction.

The advantage of this arrangement lies in the fact that only one of the movable seals, which have an imperfect sealing action as compared with fixed seals, is required. In addition, assembly is greatly facilitated in that the complete sealing arrangement for the rotor can be inserted in the bearing plate before final assembly, and, when the compressor is dismantled, remains suspended on the bearing plate so that no small parts, such as e. g. springs, can be lost.

In order that the said invention may be clearly understood and readily carried into effect the same will be hereinafter more fully described with reference to the accompanying drawings, in which.

Figure 1:
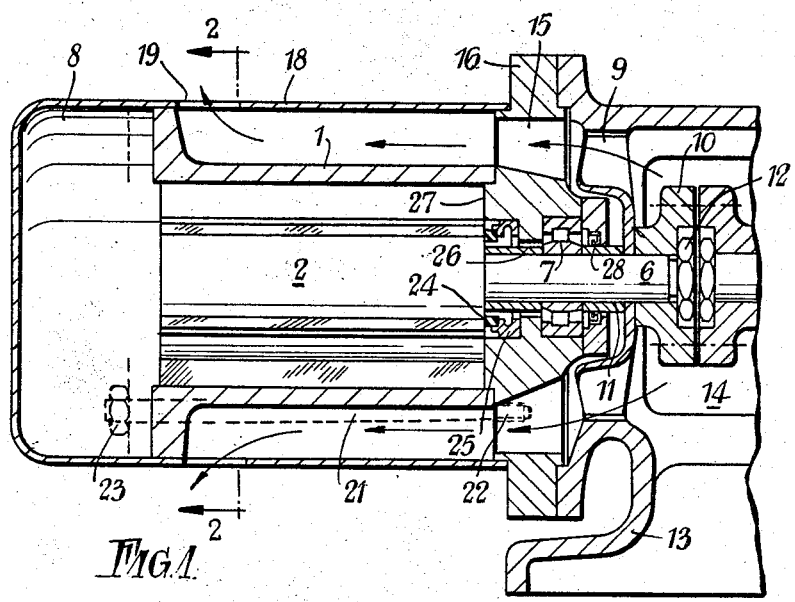
Fig. 1 is a longitudinal sectional view of an air compressor according to the invention, taken on the line 1—1 (Fig. 2), the bearing plate remote from the drive, and the rotor being illustrated in elevation.
Figure 2:
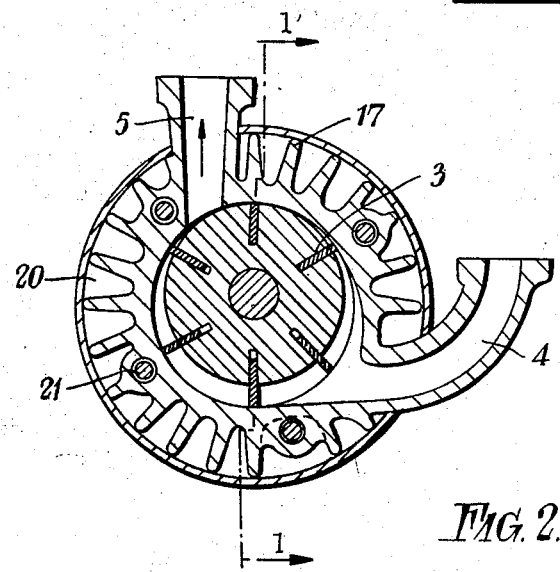
Fig. 2 is a cross-sectional view through the compressor taken on the line 2—2 (Fig. 1), the surface at which the sliding contact ring bears against the rotor being marked in chain lines.

Referring to the drawings, 1 denotes a casing which houses a rotor 2 incorporating blades 3 by means of which air drawn in through a suction pipe 4 is compressed and discharged into a pressure pipe 5. Mounted on a driving shaft 6, which is journalled in a roller bearing 7 and in a second bearing (not shown) situated in the bearing plate 8, is an axial fan wheel 9, the latter being clamped fast between a coupling or clutch element 10 and a spacer sleeve 11 on tightening of a nut 12. It is also possible to use other clamping means for the fan wheel. The coupling or clutch assembly is disposed in a housing 13 having air inlet apertures 14 through which cooling air is sucked in the direction of the arrows shown in Fig. 1. The axial fan wheel 9 delivers the cooling air through apertures 15 in a bearing plate 16 and over radially directed ribs 17 formed in the casing 1. 18 denotes an outer casing which together with the ribs 17 forms cooling air channels 20, such channels being enclosed on all sides and opening at that end remote from the axial fan wheel 9, into outlet apertures 19 formed in the casing 18. Thus it will be seen that the cooling air is forced to pass along the whole length of the housing 1. The apertures 15 in the bearing plate 16 are so dimensioned as to extend over a plurality of cooling air channels 20 situated between the ribs 17. Some of the ribs 17 are thickened to allow of the formation of holes for the reception of longitudinal tie-rods 21 which are screwed into blind holes 22, formed in those portions of the bearing plate 16 which are located between the apertures 15. It is also possible, instead of the apertures 15, which extend over a plurality of cooling air channels 20, to provide individual smaller openings which are bounded by thin ribs constructed as guide blades, and in this case only some of these ribs will be thickened to receive the longitudinal tie-rods. The longitudinal tie-rods 21 are used for the purpose of clamping the casing 1 between the two bearing plates 8 and 16, the clamping being effected on tightening of nuts such as are indicated at 23.

It is also possible to apply the underlying idea of the invention to compressors and pumps having a plurality of rotors, for example to Roots blowers, and in such a case a fan will be provided for each rotor.

The sealing arrangement for the rotor consists of a sliding-contact ring 24 and a ring carrier 25, which is so constructed of rubber or other material in a manner known per se, that it is capable of pressing the sliding contact ring 24 against the end face of the rotor 2. The ring carrier 25 is mounted with a tight fit in a hole in the bearing plate 16. The space 26 is filled with bearing grease by way of a hole which is not shown in the drawings. Oil holes, which communicate in a manner which is not shown with a lubricating oil pump, open on to the end face 27. The space 26 is sealed from the exterior in known manner by a sealing ring 28 which has an inwardly directed sealing lip.

We claim:

A rotary air compressor of multi-cell construction comprising a cylindrical casing, a rotor housed in said casing, a driving shaft passing through said casing and upon which said rotor is mounted, a plurality of external ribs formed integrally with said casing and extending in the axial direction of said casing, an outer shell enclosing said casing, an inner wall of said shell defining with said ribs a plurality of cooling air passages extending longitudinally along said casing, first and second bearing plates disposed respectively at the ends of said casing and enclosed by said shell, said driving shaft extending through said first bearing plate, said first bearing plate having defined therein a plurality of apertures respectively aligned with the plurality of cooling air passages, a first side of said first bearing plate disposed adjacent said rotor, a second opposite side of said first bearing plate disposed remote from said rotor, an axial fan mounted on said driving shaft, a suction side of said axial fan, a delivery side of said axial fan disposed in juxtaposition with said second side of said first bearing plate, an annularly recessed portion of the first side of said first bearing plate, a ring carrier formed of a resilient material disposed in said annular recessed portion, a sliding contact ring disposed between said ring carrier and said rotor and pressed by said ring carrier against said rotor, a housing enclosing said axial fan and disposed in juxtaposition with said first bearing plate, an outer wall of said housing having formed therein at least one opening communicating with the region adjacent the suction side of said axial fan, and an outer wall of said outer shell defining therein at least one opening remote from said housing and communicating with said cooling air passages.

References Cited in the file of this patent
UNITED STATES PATENTS

| | | |
|---|---|---|
| 1,436,444 | Holmes | Nov. 21, 1922 |
| 2,062,045 | Van Deventer | Nov. 24, 1936 |
| 2,469,936 | Tabbert | May 10, 1949 |
| 2,650,754 | Simon | Sept. 1, 1953 |

FOREIGN PATENTS

| | | |
|---|---|---|
| 573,822 | Germany | Apr. 6, 1933 |